(12) United States Patent
Xie et al.

(10) Patent No.: US 12,657,940 B2
(45) Date of Patent: Jun. 16, 2026

(54) IMAGE PARAGRAPH GENERATOR

(71) Applicant: Microsoft Technology Licensing, LLC, Redmond, WA (US)

(72) Inventors: Yujia Xie, Redmond, WA (US); Lu Yuan, Redmond, WA (US); Nguyen Hung Bach, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/853,907

(22) Filed: Jun. 29, 2022

(65) Prior Publication Data

US 2023/0394855 A1 Dec. 7, 2023

Related U.S. Application Data

(60) Provisional application No. 63/347,997, filed on Jun. 1, 2022.

(51) Int. Cl.
*G06F 40/20* (2020.01)
*G06F 40/40* (2020.01)
*G06V 20/70* (2022.01)

(52) U.S. Cl.
CPC .............. *G06V 20/70* (2022.01); *G06F 40/40* (2020.01)

(58) Field of Classification Search
CPC ................................ G06V 20/70; G06F 40/40
See application file for complete search history.

(56) References Cited

U.S. PATENT DOCUMENTS

| | | | | |
|---|---|---|---|---|
| 10,467,274 | B1 * | 11/2019 | Ren | G06N 3/006 |
| 10,503,738 | B2 * | 12/2019 | Jhamtani | G06F 40/30 |
| 10,592,751 | B2 * | 3/2020 | Chen | G06V 20/47 |
| 11,120,268 | B2 | 9/2021 | Gupta et al. | |
| 11,847,424 | B1 * | 12/2023 | Harkous | G06N 20/00 |
| 2017/0061250 | A1 * | 3/2017 | Gao | G06V 20/70 |
| 2017/0115853 | A1 * | 4/2017 | Allekotte | G06F 16/58 |
| 2017/0132821 | A1 * | 5/2017 | Valliani | G06F 18/24 |
| 2017/0200066 | A1 * | 7/2017 | Wang | G06N 3/08 |
| 2018/0150444 | A1 * | 5/2018 | Kasina | G06F 40/186 |
| 2018/0173681 | A1 | 6/2018 | Dedhia et al. | |
| 2019/0200050 | A1 * | 6/2019 | Zhang | G06V 20/30 |
| 2021/0064879 | A1 * | 3/2021 | Gupta | G06V 30/19173 |
| 2021/0117723 | A1 | 4/2021 | Kim et al. | |

(Continued)

OTHER PUBLICATIONS

Natasha Lomas, Hypotenuse AI wants to take the strain out of copywriting for e-commerce, Aug. 7, 2020 (Year: 2020).*

(Continued)

*Primary Examiner* — Mahelet Shiberou
(74) *Attorney, Agent, or Firm* — Barta Jones, PLLC

(57) ABSTRACT
Example solutions for image paragraph captioning use a first vision language model to generate visual information (comprising text) for an image. The visual information may include tags, an initial image caption, and information on objects within the image (e.g., further tags and captions, and object attributes and locations within the image). In some examples, the visual information further includes visual clues. A generative language model generates a plurality of image story caption candidates (e.g., descriptive paragraphs) from the visual information. A second vision language model evaluates the plurality of image story caption candidates and selects a caption as the final output caption.

20 Claims, 7 Drawing Sheets

(56) References Cited

U.S. PATENT DOCUMENTS

| 2021/0224310 A1* | 7/2021 | Zhelezniakov | ........ G06V 20/30 |
| 2022/0114361 A1 | 4/2022 | Kale et al. | |
| 2023/0103340 A1* | 4/2023 | Gao | ..................... G06V 10/464 |
| 2023/0229288 A1* | 7/2023 | Sicora | ................ G06F 3/04817 |
| | | | 715/764 |
| 2023/0316803 A1* | 10/2023 | Kelkar | .................... G06T 11/00 |
| | | | 382/103 |
| 2023/0377031 A1* | 11/2023 | Khalaf | ................ G06F 3/04847 |

OTHER PUBLICATIONS

Zou, et al., "Object Detection in 20 Years: A Survey", In Repository of arXiv:1905.05055v1, May 13, 2019, 40 Pages.
Xu, et al., "Interactive Key-Value Memory-augmented Attention for Image Paragraph Captioning", In the Proceedings of the 28th International Conference on Computational Linguistics, Dec. 8, 2020, pp. 3132-3142.
Yang, et al., "An Empirical Study of GPT-3 for Few-Shot Knowledge-Based VQA", In Repository of arXiv:2109.05014v1, Sep. 10, 2021, 10 Pages.
Yu, et al., "CoCa: Contrastive Captioners are Image-Text Foundation Models", In Repository of arXiv:2205.01917v1, May 4, 2022, 19 Pages.
Yuan, et al., "Florence: A New Foundation Model for Computer Vision", In Repository of arXiv:2111.11432v1, Nov. 22, 2021, 17 Pages.
Zeng, et al., "Socratic Models: Composing Zero-Shot Multimodal Reasoning with Language", In Repository of arXiv:2204.00598v1, Apr. 1, 2022, 20 Pages.
Zhou, et al., "Unified Vision-Language Pre-Training for Image Captioning and VQA", In the Proceedings of The Thirty-Fourth AAAI Conference on Artificial Intelligence, Feb. 7, 2020, pp. 13041-13049.
Zhu, et al., "Uni-Perceiver: Pre-training Unified Architecture for Generic Perception for Zero-shot and Few-shot Tasks", In Repository of arXiv:2112.01522v1, Dec. 2, 2021, 15 Pages.
Alayrac, et al., "Flamingo: a Visual Language Model for Few-Shot Learning", In Repository of arXiv:2204.14198v1, Apr. 29, 2022, 66 Pages.
Anderson, et al., "SPICE: Semantic Propositional Image Caption Evaluation", In Proceedings of European conference on computer vision, Oct. 11, 2016, pp. 382-398.
Brown, et al., "Language Models are Few-Shot Learners", In the Proceedings of the 34th International Conference on Neural Information Processing Systems, Dec. 6, 2020, 25 Pages.
Chatterjee, et al., "Diverse and Coherent Paragraph Generation from Images", In Proceedings of the European Conference on Computer Vision, Sep. 8, 2018, pp. 747-763.
Chen, et al., "Microsoft COCO Captions: Data Collection and Evaluation Server", In Repository of arXiv:1504.00325v1, Apr. 1, 2015, 7 Pages.
Cho, et al., "Unifying Vision-and-Language Tasks via Text Generation", In the Proceedings of the 38th International Conference on Machine Learning, vol. 139, Jul. 18, 2021, 12 Pages.
Dai, et al., "Dynamic Head: Unifying Object Detection Heads with Attentions", In Proceedings of the IEEE/CVF Conference on Computer Vision and Pattern Recognition, Jun. 20, 2021, pp. 7369-7378.
Dai, et al., "Towards Diverse and Natural Image Descriptions via a Conditional GAN", In Proceedings of the IEEE International conference on computer vision, Oct. 22, 2017, pp. 2989-2998.
Denkowski, et al., "Meteor Universal: Language Specific Translation Evaluation for Any Target Language", In Proceedings of the ninth workshop on statistical machine translation, Jun. 26, 2014, pp. 376-380.
Eichenberg, et al., "MAGMA—Multimodal Augmentation of Generative Models through Adapter-based Finetuning", In Repository of arXiv:2112.05253v1, Dec. 9, 2021, pp. 1-11.

Fei-Fei, et al., "Searching for Computer Vision North Stars", In Dædalus, the Journal of the American Academy of Arts & Sciences, vol. 151, Issue 2, May 1, 2022, pp. 85-99.
Guo, et al., "Matching Visual Features to Hierarchical Semantic Topics for Image Paragraph Captioning", In Repository of arXiv:2105.04143v1, May 10, 2021, 20 Pages.
Huang, et al., "Visual Storytelling", In Proceedings of the 2016 Conference of the North American Chapter of the Association for Computational Linguistics: Human Language Technologies, Jun. 2016, pp. 1233-1239.
Jia, et al., "Scaling Up Visual and Vision-Language Representation Learning With Noisy Text Supervision", In the Proceedings of the 38th International Conference on Machine Learning, vol. 139, Jul. 18, 2021, 13 Pages.
Jocher, et al., "ultralytics/yolov5: v3.1—Bug Fixes and Performance Improvements", Retrieved From: https://zenodo.org/record/4154370#.Yr2RwRVByUk, Oct. 29, 2020, 6 Pages.
Johnson, et al., "Image Retrieval using Scene Graphs", In the Proceedings of IEEE Conference on Computer Vision and Pattern Recognition, Jun. 7, 2015, pp. 3668-3678.
Jyoshna, et al., "Image Paragraph Captioning Using Deep Learning and NPL Techniques", A Project report submitted in partial fulfillment of the requirements for the award of the degree of Bachelor of Technology in Computer Science Engineering, 2020, 85 Pages.
Klein, et al., "Accurate Unlexicalized Parsing", In the Proceedings of the 41st Annual Meeting of the Association for Computational Linguistics, Jul. 2003, 8 Pages.
Krause, et al., "A Hierarchical Approach for Generating Descriptive Image Paragraphs", In the Proceedings of 2017 IEEE Conference on Computer Vision and Pattern Recognition, Jul. 21, 2017, pp. 3337-3345.
Krishna, et al., "Visual Genome: Connecting Language and Vision Using Crowdsourced Dense Image Annotations", In the International Journal of Computer Vision, vol. 123, Issue 1, May 2017, pp. 32-73.
Li, et al., "BLIP: Bootstrapping Language-Image Pre-training for Unified Vision-Language Understanding and Generation", In Repository of arXiv:2201.12086v1, Jan. 28, 2022, 12 Pages.
Li, et al., "DailyDialog: A Manually Labelled Multi-turn Dialogue Dataset", In Repository of arXiv:1710.03957v1, Oct. 11, 2017, 10 Pages.
Liang, et al., "Recurrent Topic-Transition GAN for Visual Paragraph Generation", In the Proceedings of the IEEE International conference on computer vision, Oct. 22, 2017, pp. 3382-3391.
Lin, Chin-Yew, "ROUGE: A Package for Automatic Evaluation of Summaries", In the Journal of Association for Computational Linguistics, Jul. 2004, 8 Pages.
Liu, et al., "Beyond Narrative Description: Generating Poetry from Images by Multi-Adversarial Training", In the Proceedings of the 26th ACM international conference on Multimedia, Oct. 22, 2018, pp. 783-791.
Luo, et al., "A thorough review of models, evaluation metrics, and datasets on image captioning", Retrieved From: https://ietresearch.onlinelibrary.wiley.com/doi/full/10.1049/ipr2.12367, Nov. 22, 2021, pp. 311-332.
Luo, et al., "Curiosity-driven Reinforcement Learning for Diverse Visual Paragraph Generation", In the Proceedings of the 27th ACM International Conference on Multimedia, Oct. 21, 2019, pp. 2341-2350.
Mao, et al., "Show and Tell More: Topic-Oriented Multi-Sentence Image Captioning", In the Proceedings of the Twenty-Seventh International Joint Conference on Artificial Intelligence, Jul. 13, 2018, pp. 4258-4264.
Marr, David, "Vision: A Computational Investigation into the Human Representation and Processing of Visual Information", Published in MIT Press, 2010, 41 Pages.
Melas-Kyriazi, et al., "Training for Diversity in Image Paragraph Captioning", In the Proceedings of the 2018 Conference on Empirical Methods in Natural Language Processing, Oct. 31, 2018, pp. 757-761.
Miller, Georgea., "WordNet: a lexical database for English", In the Journal of Communications of the ACM, vol. 38, Issue 11, Nov. 1995, pp. 39-41.

(56) References Cited

OTHER PUBLICATIONS

Nikolaus, et al., "Compositional Generalization in Image Captioning", In Repository of arXiv:1909.04402v1, Sep. 10, 2019, 16 Pages.

Papineni, et al., "Bleu: a Method for Automatic Evaluation of Machine Translation", In the Proceedings of the 40th Annual Meeting of the Association for Computational Linguistics, Jul. 2002, 8 Pages.

Radford, et al., "Learning Transferable Visual Models From Natural Language Supervision", In the Proceedings of the 38th International Conference on Machine Learning, vol. 139, Jul. 18, 2021, 16 Pages.

Rajpurkar, et al., "SQuAD: 100,000+ Questions for Machine Comprehension of Text", In the Repository of arXiv:1606.05250v1, Jun. 16, 2016, 10 Pages.

Salvador, et al., "Inverse Cooking: Recipe Generation from Food Images", In the Proceedings of 2019 IEEE/CVF Conference on Computer Vision and Pattern Recognition, Jun. 15, 2019, pp. 10445-10454.

Schuster, et al., "Generating Semantically Precise Scene Graphs from Textual Descriptions for Improved Image Retrieval", In the Proceedings of the Fourth Workshop on Vision and Language, Sep. 18, 2015, pp. 70-80.

Shah, Chintan, "Image Captioning: Generating Stories from Unstructured Data Using Applied NLG", Retrieved From: https://www.dataversity.net/image-captioning-generating-stories-from-unstructured-data-using-applied-nlg/, Apr. 13, 2021, 7 Pages.

Shi, et al., "S2TD: A Tree-Structured Decoder for Image Paragraph Captioning", In the Proceedings of ACM Multimedia Asia, Dec. 1, 2021, 7 Pages.

Singh, "FLAVA: A Foundational Language And Vision Alignment Model", In Repository of arXiv:2112.04482v1, Dec. 8, 2021, 17 Pages.

Su, et al., "Language Models Can See: Plugging Visual Controls in Text Generation", In Repository of arXiv:2205.02655v1, May 5, 2022, 20 Pages.

Sutskever, et al., "CLIP: Connecting Text and Images", Retrieved From: https://openai.com/blog/clip/, Jan. 5, 2021, 16 Pages.

Thrush, et al., "Winoground: Probing Vision and Language Models for Visio-Linguistic Compositionality", In the Proceedings of The IEEE / CVF Computer Vision and Pattern Recognition Conference, Jun. 19, 2022, pp. 5238-5248.

Vedantam, et al., "CIDEr: Consensus-based image description evaluation", In the Proceedings of 2015 IEEE Conference on Computer Vision and Pattern Recognition, Jun. 7, 2015, pp. 4566-4575.

Wang, et al., "Convolutional Auto-encoding of Sentence Topics for Image Paragraph Generation", In Repository of arXiv:1908.00249v1, Aug. 1, 2019, 7 Pages.

Xie, et al., "Visual Clues: Bridging Vision and Language Foundations for Image Paragraph Captioning", In Repository of arXiv:2206.01843v1, Jun. 3, 2022, 20 Pages.

Wang, Zirui, "SimVLM: Simple Visual Language Model Pre-training with Weak Supervision", Retrieved From: https://ai.googleblog.com/2021/10/simvlm-simple-visual-language-model-pre.html, Oct. 15, 2021, 5 Pages.

Wang, et al., "Unifying Architectures, Tasks, and Modalities Through a Simple Sequence-to-Sequence Learning Framework", In Repository of arXiv:2202.03052v1, Feb. 7, 2022, 23 Pages.

Wu, et al., "Image Captioning with an Intermediate Attributes Layer", In Repository of arXiv:1506.01144v2, Jun. 6, 2015, 11 Pages.

Xiao, et al., "Azure AI milestone: New foundation model Florence v1.0 advances state of the art, topping popular computer vision leaderboards", Retrieved From: https://www.microsoft.com/en-us/research/blog/azure-ai-milestone-new-foundation-model-florence-v1-0-pushing-vision-and-vision-language-state-of-the-art/, Dec. 14, 2021, 5 Pages.

Cho, et al., "Unifying Vision-and-Language Tasks via Text Generation", In Repository of arXiv:2102.02779v1, Feb. 4, 2021, 16 Pages.

"International Search Report and Written Opinion Issued in PCT Application No. PCT/US23/018767", Mailed Date: Jul. 25, 2023, 10 Pages.

* cited by examiner

START

RECEIVE IMAGE     402

GENERATE IMAGE TAG     404

GENERATE INITIAL IMAGE STORY CAPTION     406

DETECT OBJECTS IN IMAGE     408

DETERMINE OBJECT INFORMATION     410

GENERATE VISUAL CLUES     412

414
GENERATE PLURALITY OF IMAGE STORY CAPTION CANDIDATES

SELECT CAPTION     416

PAIR IMAGE AND SELECTED CAPTION     418

END

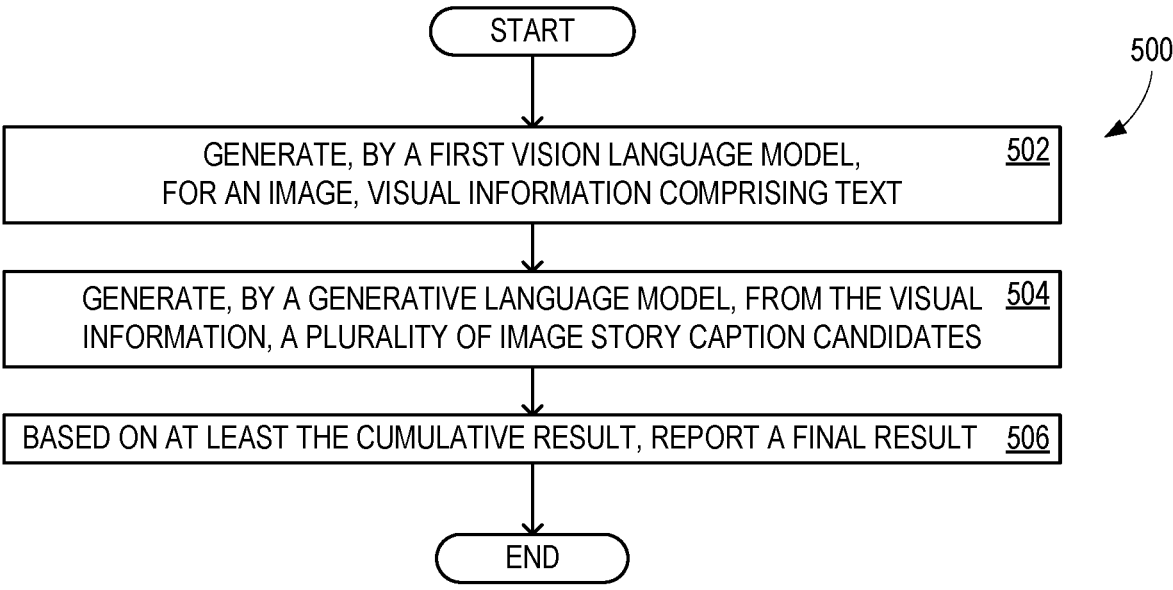

```
                    ┌──────────┐
                    │  START   │
                    └────┬─────┘
                         │
                         ▼
   ┌──────────────────────────────────────────────────────────┐
   │  GENERATE, BY A FIRST VISION LANGUAGE MODEL,          502 │
   │  FOR AN IMAGE, VISUAL INFORMATION COMPRISING TEXT         │
   └────────────────────────────┬─────────────────────────────┘
                                 │
                                 ▼
   ┌──────────────────────────────────────────────────────────┐
   │  GENERATE, BY A GENERATIVE LANGUAGE MODEL, FROM THE VISUAL 504 │
   │  INFORMATION, A PLURALITY OF IMAGE STORY CAPTION CANDIDATES │
   └────────────────────────────┬─────────────────────────────┘
                                 │
                                 ▼
   ┌──────────────────────────────────────────────────────────┐
   │ BASED ON AT LEAST THE CUMULATIVE RESULT, REPORT A FINAL RESULT  506 │
   └────────────────────────────┬─────────────────────────────┘
                                 │
                                 ▼
                            ┌──────────┐
                            │   END    │
                            └──────────┘
```

Figure 6:
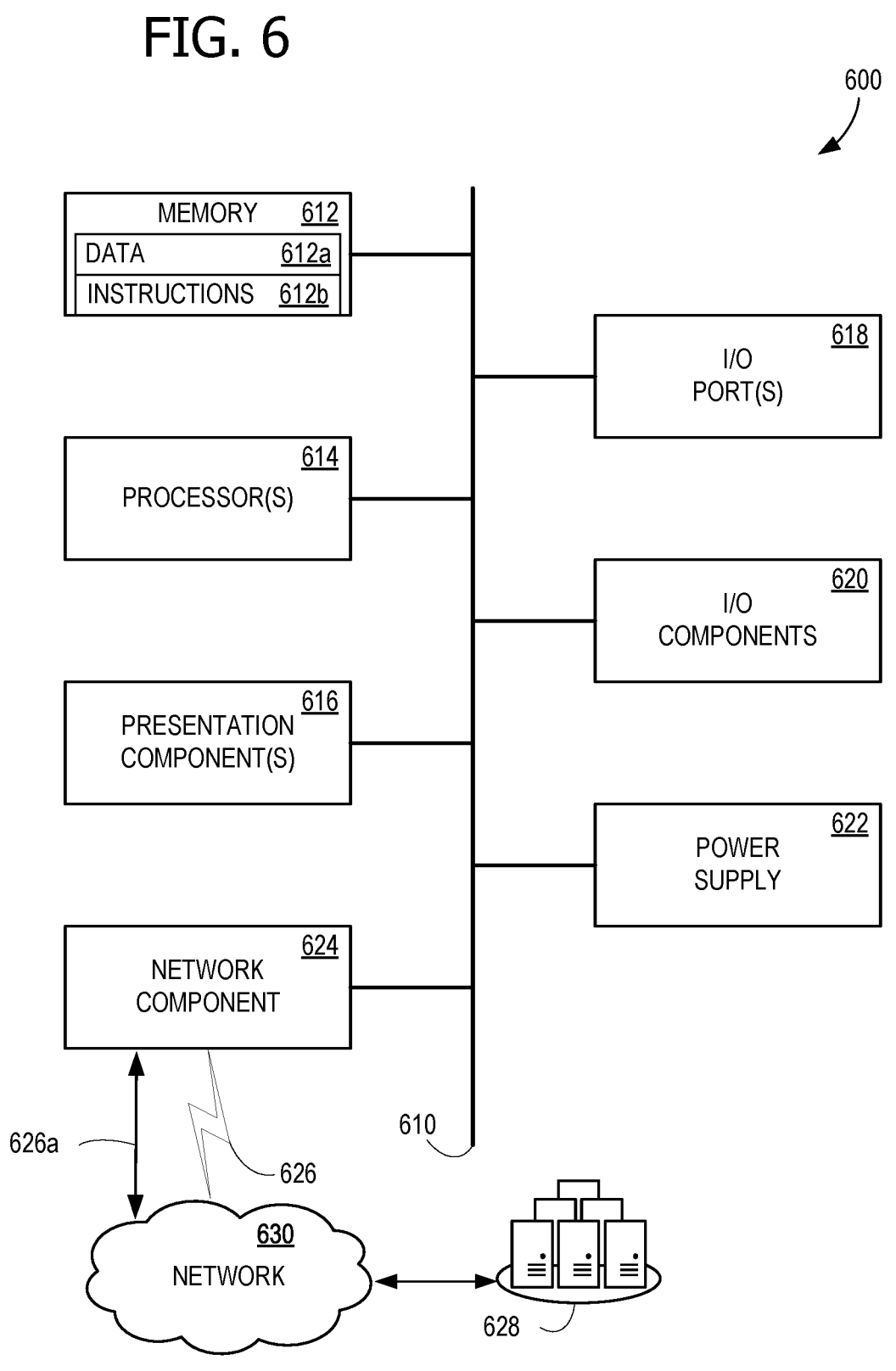

| MEMORY | 612 |
|---|---|
| DATA | 612a |
| INSTRUCTIONS | 612b |

618
I/O
PORT(S)

614
PROCESSOR(S)

620
I/O
COMPONENTS

616
PRESENTATION
COMPONENT(S)

622
POWER
SUPPLY

624
NETWORK
COMPONENT

626a

626

610

630
NETWORK

628

IMAGE PARAGRAPH GENERATOR

CROSS-REFERENCE TO RELATED APPLICATION

This application claims priority to U.S. Provisional Patent Application No. 63/347,997, entitled "IMAGE PARA-GRAPH GENERATOR," filed Jun. 1, 2022, the disclosure of which is incorporated herein by reference in its entirety.

BACKGROUND

Generating an accurate, coherent, and long text description of an image using human-like expression is preferable to simple captioning in certain scenarios. Currently, pipe-lines for vision-based caption generation models collect a large number of image-story pairs and train an end-to-end model for text generation based on image input. Unfortunately, this process requires a large volume of training data that is expensive to obtain, due to production of such training data being labor-intensive and time consuming, and expensive to process, due to the large amount of computing resources required. Further, the output is generally a simple caption.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for image paragraph captioning include generating, by a first vision language model, for an image, visual information comprising text; generating, by a generative language model, from the visual information, a plurality of image story caption candidates; and based on at least evaluation of the image and the plurality of image story caption candidates by a second vision language model, selecting a selected caption from among the plurality of image story caption candidates.

BRIEF DESCRIPTION OF THE DRAWINGS

The disclosed examples are described in detail below with reference to the accompanying drawing figures listed below:

FIG. 5 shows another flowchart illustrating exemplary operations that may occur when using examples of the disclosure; and FIG. 6 shows a block diagram of an example computing device suitable for implementing some of the various examples disclosed herein.

Corresponding reference characters indicate correspond-ing parts throughout the drawings.

DETAILED DESCRIPTION

Figure 1:
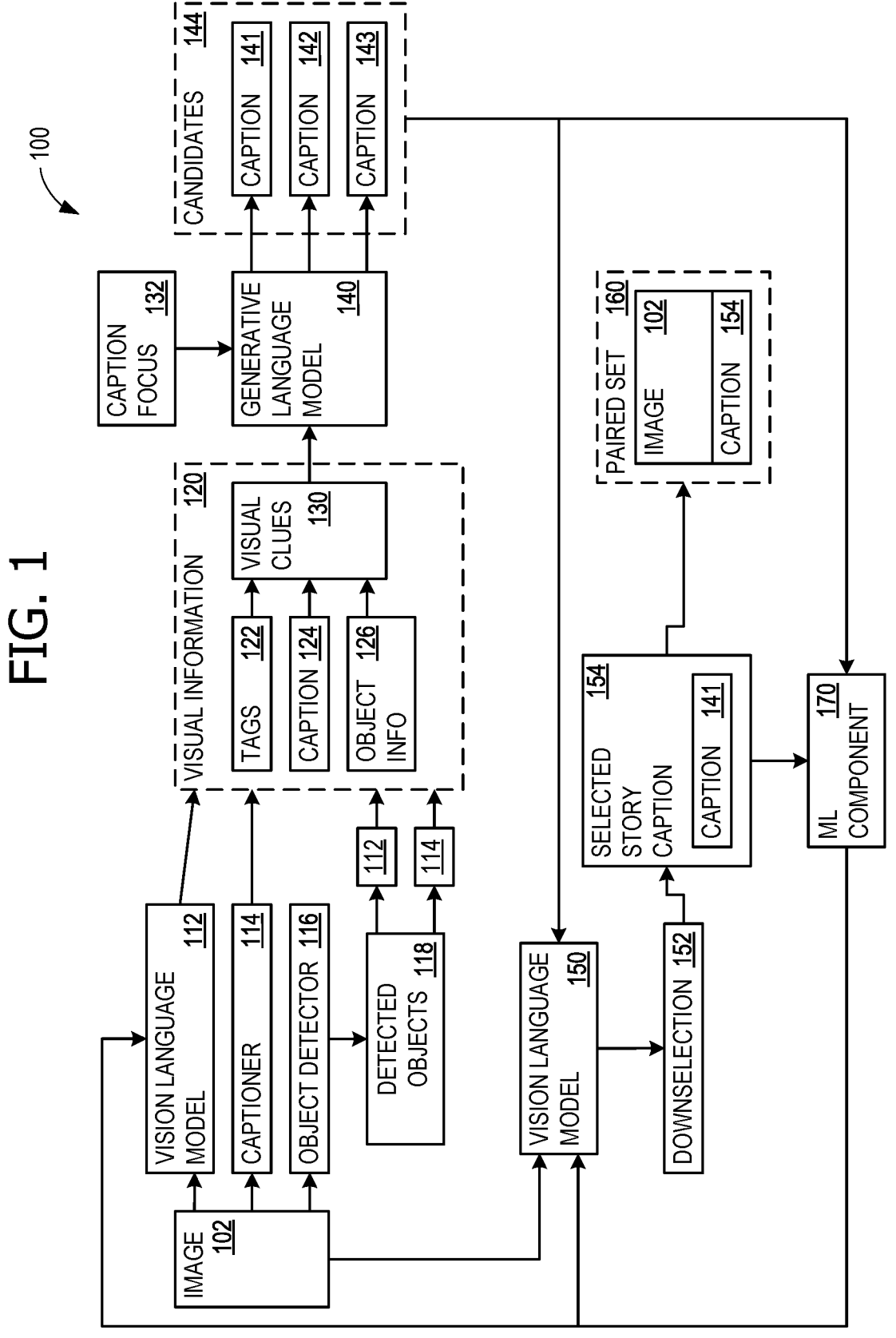
FIG. 1 illustrates an example architecture that advanta-geously provides image paragraph captioning.

The various examples will be described in detail with reference to the accompanying drawings. Wherever prefer-able, the same reference numbers will be used throughout the drawings to refer to the same or like parts. References made throughout this disclosure relating to specific examples and implementations are provided solely for illus-trative purposes but, unless indicated to the contrary, are not meant to limit all examples.

Example solutions for image paragraph captioning use a first vision language model to generate visual information comprising text for an image. The visual information may include tags, an initial image caption, and information on objects within the image. The information on objects con-tains further tags and captions, and object attributes and locations within the image. In some examples, the visual information further includes visual clues. A generative lan-guage model generates a plurality of image story caption candidates, such as story captions or descriptive paragraphs, from the visual information. A second vision language model evaluates the plurality of image story caption candi-dates and selects a story caption as the final output caption.

Relative to captions generated by existing systems, "story" captions or paragraph captions generated by the present disclosure are longer, more descriptive, more accu-rate, and include additional details about the input image or additional information related to the input image. In this manner, the input image is described more thoroughly and precisely.

Further, aspects of the disclosure improve the operations of computing devices, for example, improving the comput-ing efficiency of automated image paragraph captioning by at least generating, by a generative language model, from visual information, a plurality of image story caption can-didates. By leveraging visual information, including visual clues, aspects of the disclosure are able to forego the need to computationally process the same volume of detailed training data that is required of other solutions. Multiple practical applications exist for the improved image para-graph captioning, as identified below, and are able to benefit from the improvements disclosed herein.

A rich semantic representation of an input image, such as image tags, object attributes and locations, and captions, is constructed as a structured textual prompt, termed "visual clues", using a vision foundation model. Based on the visual clues, a large language model, which is able to generate long, coherent paragraphs, is used to produce a series of comprehensive descriptions for the visual content. This is then verified by a vision model to select the candidate that best aligns with the image. By focusing on guiding and constraining the generated text (visual clues) to bridge large pre-trained vision foundation models with zero-shot capa-bility and language models to generate semantic proposi-tional content, additional cross-modal training becomes unnecessary. This reduces the computational burden for generating story captions, while also increasing the quality of the output because story captions are generated instead of simple, one- or two-line captions. For example, management of computational resources for story captioning an image is improved at least by generating visual information including an image tag, constructing a visual clue from the image tag, and using the visual information to generate candidate story captions from which a single story caption can be selected.

Figure 2:
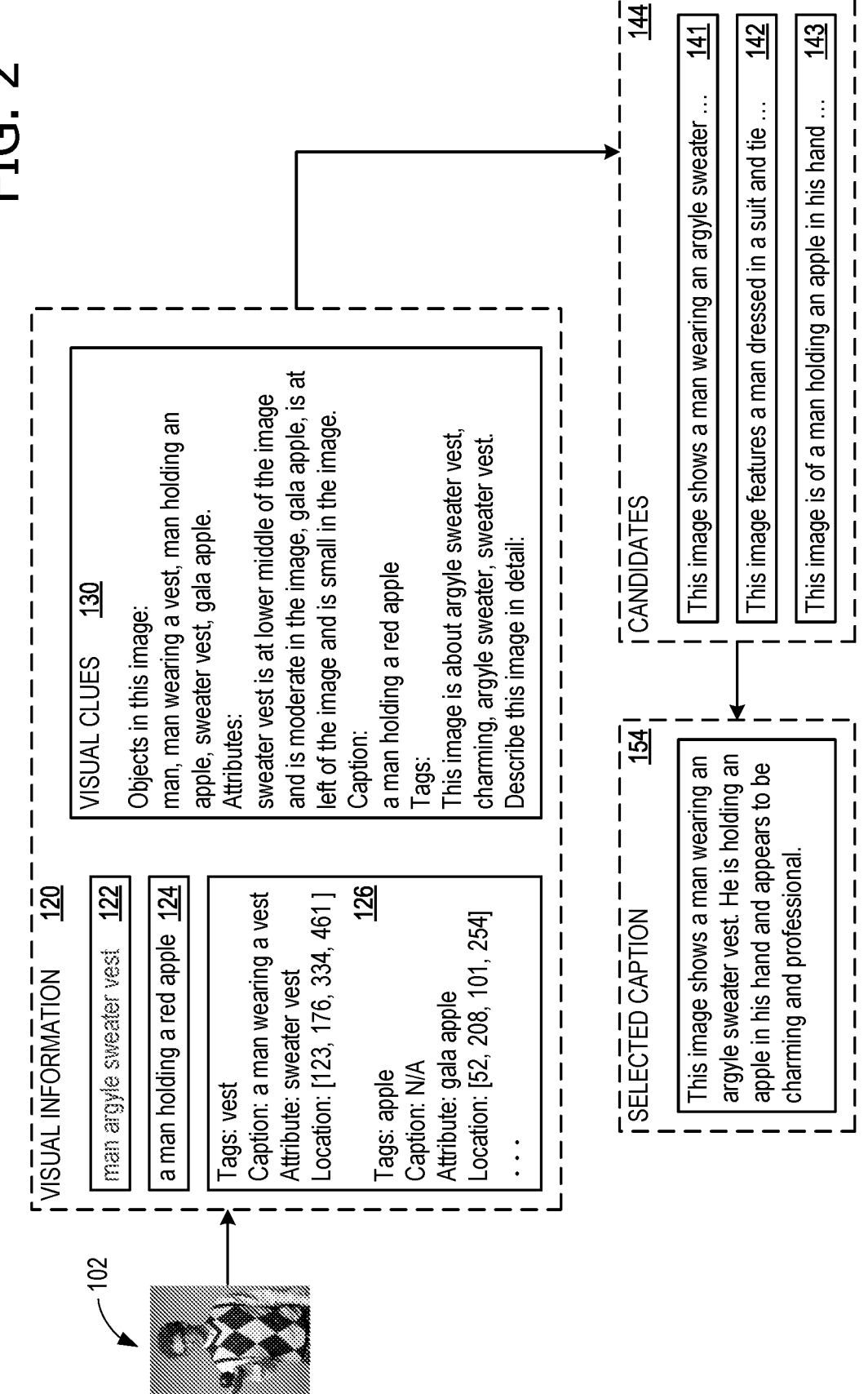
FIG. 2 illustrates further details for the examples of visual information and other aspects of the disclosure.

FIG. 1 illustrates an example architecture 100 that advantageously provides improved image paragraph captioning, and for clarity of presentation, additional detail for architecture 100 is shown in FIG. 2. FIG. 1 and FIG. 2 may be combined into a single example or embodiment. The operation of architecture 100 is described below, including in relation to FIG. 4A. Architecture 100 intakes an image 102 and has a vision language model 112, a captioner 114, and an object detector 116. Object detector 116 detects a plurality of objects 118 in image 102. Vision language model 112 and captioner 114 produce visual information 120 from image 102 and plurality of objects 118.

Visual information 120 comprises text that describes what is contained within image 102, such as image tags 122, an initial image caption 124, and object information 126. In some examples, image tags 122 includes one or more tags identifying objects within image 102, and object information 126 includes additional tags, captions, attributes, and locations for objects within image 102. Visual information 120 also includes visual clues 130 that is based on at least image tags 122, initial image caption 124, and object information 126. Visual clues 130 is a semantic representation of image 102 and comprises semantic components from object and attribute tags to localized detection regions and region captions.

A generative language model 140 generates a plurality of image story caption candidates 144, which includes story captions 141, 142, and 143, from visual information 120, which includes, from visual clues 130. In some examples, generative language model 140 intakes a caption focus 132 and generates plurality of image story caption candidates 144 based on at least caption focus 132. Caption focus 132 acts as an input that instructs generative language model 140 to produce story captions that are particularly suited for some desired application of using architecture 100.

Example applications for leveraging the capability of architecture 100, which may be instructed using caption focus 132, include visual storytelling, automatic advertisement generation, social media posting, background explanation, accessibility, and machine learning (ML) training data annotation. For visual storytelling, architecture 100 produces stories, which may appear to be written by a human author, and are based on input image 104. To select this function, caption focus 132 may be "Tell me a creative story." Persons with vision challenges may not be able to view image 104 easily. In some scenarios, visual storytelling may also be able to provide accessibility accommodation, or some other setting of caption focus 132.

For automatic advertisement generation, a seller uploads image 104 and caption focus 132 may be "Write a product description to sell in an online marketplace." In some examples, caption focus 132 may indicate a number of different objects within image 104 for which to generate an advertisement. For a social media posting, the actual posting may be performed by a bot, and caption focus 132 may be "Social media post." In some applications, the user may wish to edit selected story caption 154.

A background explanation may be used to provide some background knowledge for a viewer of image 104, such as on a wiki site or in a textbook. Caption focus 132 may be "Textbook text." In some scenarios, architecture 100 is able to provide enhanced searching of image data, using a "Textbook text" (or similar) instruction as caption focus 132. In some further scenarios, architecture 100 is able to annotate images to use in training ML models, by using "Annotate setting of image data, using a training data annotation" as caption focus 132. This use of architecture 100 is able to scale and reduce the amount of human labor involved in producing a large volume of labeled training data.

A vision language model 150 selects a selected story caption 154, which was previously story caption 141 in the illustrated example, from among plurality of image story caption candidates 144. In some examples, vision language model 112 and vision language model 150 both comprise a common vision language model. In some examples, vision language model 112 and vision language model 150 are different models, although with somewhat similar architecture. Visual clues 130 is rich in open-vocabulary expressions, marking a significant improvement over symbolic approaches with closed-set vocabularies. Access to abundant multimodal language data, such as image alt-text and video subtitles, powers neural visual representations from contrastive language-image pre-training. The combination provides for bridging with explicit structured textural clues.

Visual clues 130 are provided to generative language model 140, which in some examples, comprises an autoregressive language model that uses deep learning to produce human-like text. Generative language model 140 produces crisp language descriptions that are informative to a user, without being cluttered with irrelevant information from visual clues 130. An open-loop process potentially suffers from object hallucination, because the outputs from generative language model 140 may not be governed. Object hallucination occurs when objects are identified that are not actually present within an image. Thus, a closed-loop verification procedure, passing plurality of image story caption candidates 144, output from generative language model 140, through vision language model 150, ensures that selected story caption 154 is grounded to image 102.

In some examples, vision language model 150 directly selects selected story caption 154 from among plurality of image story caption candidates 144, whereas in other examples, vision language model 150 scores plurality of image story caption candidates 144 and a down selection component 152 selects selected story caption 154 based on at least the scores from vision language model 150. Selected story caption 154 is then paired with image 102 in paired set 160. In some examples, a machine learning (ML) component 170 improves the operation of vision language model 112 and/or vision language model 150 be performing ongoing training, as described below in relation to FIGS. 3 and 4B.

Figure 3:
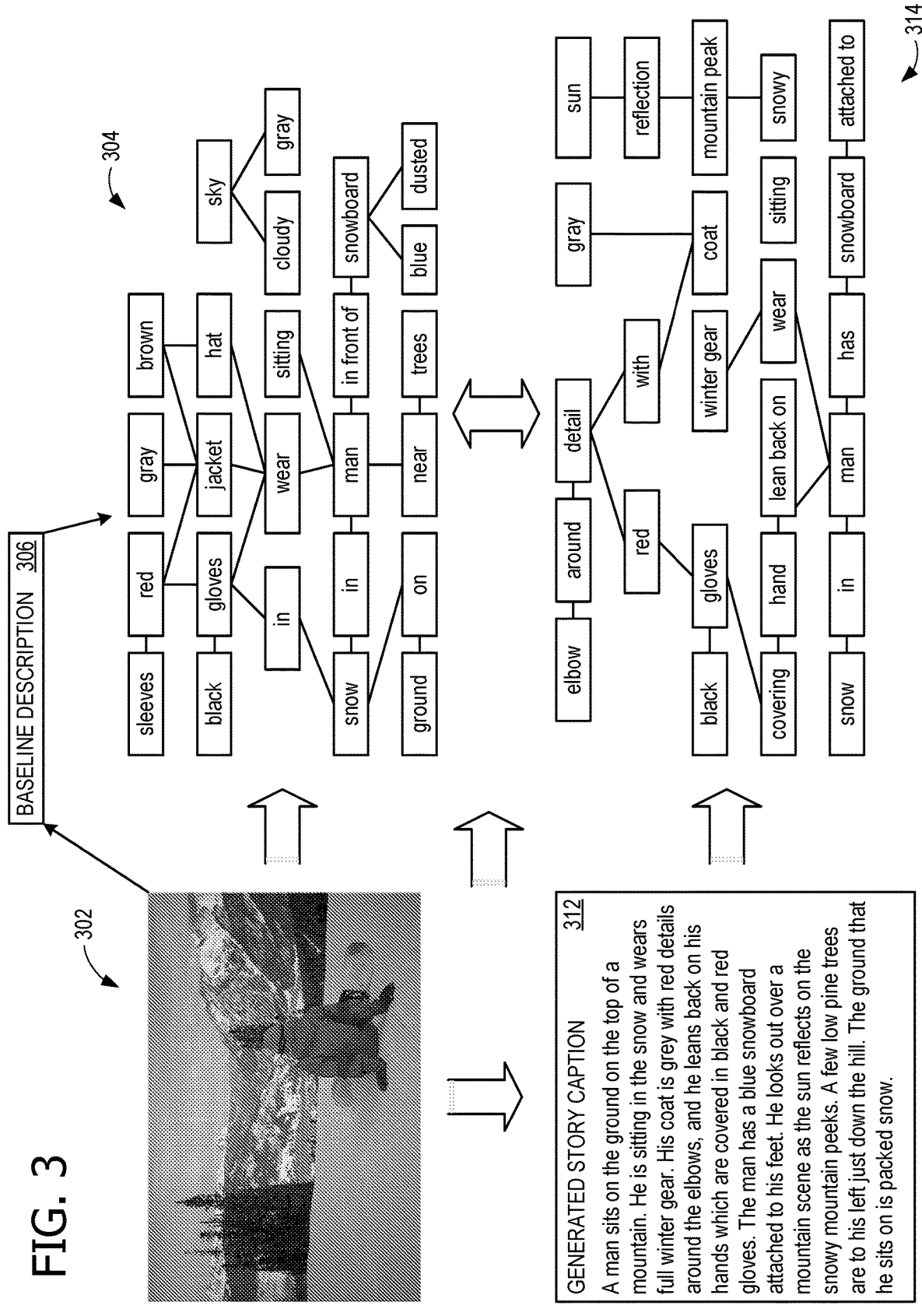
FIG. 3 illustrates examples of graphs that may be used for evaluating and improving the performance of examples of the disclosure.

FIG. 3 illustrates examples of graphs that may be used for evaluating and improving the performance of architecture 100. A baseline graph 304 is generated for an image 302, using either tags for objects automatically detected in image 302, or extracted from text of a baseline description 306 ("ground truth") authored by a human. In parallel, architecture 100 generates story caption 312, which may be selected story caption 154 or any of plurality of image story caption candidates 144. Comparing the text of story caption 312 to the text of baseline description 306 would not be a meaningful result, because the variation in human language permits widely different captions to both be good descriptions.

Measuring caption accuracy on scene graphs extracted from generated text and extracted image tags, which may include object tags about specific objects in the image, may match better with human judgment for what constitutes a "good description." For example, given an image with content "A man sitting in front of a blue snowboard", a good evaluation for a generated caption should determine whether each of the semantic propositions is correct, namely, (1) a man is sitting; (2) a man is in front of a snowboard; and (3)

the snowboard is blue, rather than matching the exact words of another description. Thus, graphs 304 and 314 are compared.

Graphs 304 and 314 include objects, attributes of the objects, and relationships between the objects. Baseline graph 304 represents the automatically extracted objects or text of baseline description 306, and caption graph 314 represents the text of story caption 312. The process of generating a score, such as an F-score, for story caption 312 and using the score to improve architecture 100 is described in additional detail below and in relation to FIG. 4B.

Returning again to FIG. 1, further detail, to complement the description above, is provided. In response to receiving an image I (image 102), the examples of the disclosure generate long and coherent descriptive text based on image inputs that leverage pre-trained models. In some examples, this is accomplished in three stages: (1) Represent I with visual clues S (visual clues 130), which contain rich visual information, using at least visual language model 112 and captioner 114. (2) Provide visual clues 130 (S) to a language model (generative language model 140) to generate K candidate paragraphs $$\{T_i\}_{i=1}^K$$

(plurality of image story caption candidates 144). (3) Select a paragraph T* from the candidates $$\{T_i\}_{i=1}^K.$$

The overall framework is illustrated in FIG. 1 as architecture 100.

Vision language model 112 has open-vocabulary capability to extract visual information 120, including visual clues 130, and is pre-trained on image-text pairs $\{x_i, y_i\}$.

Given a minibatch $\mathcal{B}$, the models are optimized by contrastive loss:

$$\mathcal{L} = -\frac{1}{|B|} \sum_{x_i, y_i \in \mathcal{B}} \left( \frac{\exp(\langle f_v(x_i), f_t(y_i) \rangle / t)}{\sum_{y_j \in \mathcal{B}, j \neq 1} \exp(\langle f_v(x_i), f_t(y_j) \rangle / t)} + \right.$$
$$\left. \frac{\exp(\langle f_v(x_i), f_t(y_i) \rangle / t)}{\sum_{x_j \in \mathcal{B}, j \neq 1} \exp(\langle f_v(x_j), f_t(y_i) \rangle / t)} \right) \qquad \text{Eq. (1)}$$

where $t$ is the temperature, $f_v(\cdot)$ is the image encoder, $f_t(\cdot)$ is the text encoder, $\langle \cdot, \cdot \rangle$ is the inner product between two vectors, and $|A|$ is the cardinality of set A.

The loss, $\mathcal{L}$, uses inner products to measure the similarity between the encoded image $f_v(x_i)$ and encoded text $f_t(y_i)$, and higher similarities are encouraged if the images and texts are paired. Such a pre-trained model is capable of selecting the tags that describe the image I from a set of customized tags by computing the similarities. Given a set of tags $$\{t_i\}_{i=1}^N,$$

similarities between the input image I and the tags $\mathcal{T}$ is computed, and the tags with top-M similarities are adopted:

$$\tau = \{t_j^*\}_{j=1}^M = \arg_{t_i, i=1,\ldots,N} \text{top\_M} \langle f_v(I), f_t(t_i) \rangle \qquad \text{Eq. (2)}$$

Captioner 114 is a caption model c(•) that is used to generate an overall image description c(I). Object detector 116 is an object detection model that provides the locations of the possible objects in the format of bounding boxes. In some examples, the bounding boxes are processed with a non-maximum suppression technique to filter out repetitions.

Denoting the object proposals as $$\{b_j\}_{j=1}^R,$$

image regions are cropped from corresponding boxes $$\{p_j\}_{j=1}^R.$$

The indices of the bounding boxes are associated with objects that can be named by a tag set:

$$\mathcal{P} = \{\ell_k\}_{k=1}^Q = \{j | \langle f_v(p_j), f_t(t_j) \rangle > \beta, i = 1, \ldots, N, j = 1, \ldots, R\} \qquad \text{Eq. (3)}$$

where $\beta$ is a threshold certifying whether $t_i$ is aligned with $p_j$. Given a set of customized attributes $$\{a_i\}_{i=1}^V,$$

each selected proposal $\ell_k$ from $\mathcal{P}$ is assigned to an attribute:

$$a_{\ell_k}^* = \text{argmax}_{a_i, i=1,\ldots,V} \langle f_v(p_{\ell_k}), f_t(a_i) \rangle \qquad \text{Eq. (4)}$$

and the corresponding tags:

$$O_{\ell_k} = \{t_i | \langle f_v(p_{\ell_k}), f_t(t_i) \rangle > \beta, i = 1, \ldots, N\} \qquad \text{Eq. (5)}$$

In addition to the tags, attributes, and bounding boxes, captioner 114 (c(•)) is also used to provide more descriptive texts $$\{c(p_{\ell_k})\}_{k=1}^Q$$

(object information 126). A tag set $\mathcal{T}$, tags 122, and a caption c(I) are collected as global descriptions of image 102, and a quadruple $$(b_{\ell_k}, a_{\ell_k}^*, O_{\ell_k}, c(p_{\ell_k}))$$

is collected as local descriptions for each selected bounding box.

The collected visual information 120 (tags 122, initial image caption 124, and object information 126) is then formatted into structured visual clues 130, which is used to directly prompt generative language model 140. As the tags $\mathcal{T}$ are usually more informative and local extractions are typically noisier, visual clues 130 is input with the order of local descriptions, caption, and tags, in some examples. This is because, in some scenarios, the information near the end of the prompt will have a more significant influence on generative language model 140.

To incorporate each local description, the bounding boxes $b_{\ell_k}$ are reformatted into plain language by describing its location and size. In some examples, a rule-based method is used to divide the locations into nine classes {"upper left", "upper middle", "upper right", "left", "middle", "right", "lower left", "lower middle", "lower right"}, and size are divided into three classes {"large", "moderate-sized", "small"}. These are incorporated into visual clues 130, which is fed into generative language model 140 to synthesize K candidate paragraphs $$\{T_i\}_{i=1}^K$$

(plurality of image story caption candidates 144) that have descriptive details.

Vision language model 150 (which may be similar to or the same as vision language model 112, in some examples) selects the candidate (selected story caption 154) that best aligns with image 102:

$$S = \mathrm{argmax}_{T_i, i=1,\dots,K} \langle f_v(I), f_t(T_i) \rangle \qquad \text{Eq. (6)}$$

To further rule out the unrelated concepts in S, some examples further filter the output at the sentence level by splitting it into sentences ($s_1$, $s_2$, . . . , $s_U$), and using a threshold $\gamma$ to remove the sentences with lower similarities to obtain the final output T* (selected story caption 154):

$$T^* = \{s_i | \langle f_v(I), f_t(s_i) \rangle > \gamma, i = 1, \dots, U\} \qquad \text{Eq. (7)}$$

In an example, vision language model 112 and/or 150 may use Contrastive Language-Image Pre-training (CLIP) or Florence-H, and captioner 114 may comprise Block-based image Processor (BLIP) tuned on the Common Objects in Context (COCO) captions dataset. Object detector 116 may comprise a general, class-agnostic object detector that uses non-maximum suppression (NMS) to select the top 100 object proposals, and generative language model 140 may comprise Generative Pre-trained Transformer 3 (GPT-3).

In an example, to expand differences in plurality of image story caption candidates 144, temperature, $t$, is set to 0.8, a frequency penalty is set to 0.5, the maximum number of tokens is set to 100. Tag set, $\mathcal{T}$, is based on the most frequently searched 400 thousand queries in an internet search engine, although with open-vocabulary capability, architecture 100 is able to adapt to a specific domain by replacing the tag set with a customized tag set for the local objects. The attribute set, $$\{a_i\}_{i=1}^K$$

is set to the Visual Genome dataset. The number of tags, M, is set to 5, thresholds $\beta$ and $\gamma$ are set to 0.2, and the number of candidates, K, is set to 40. In an example, among K=40 candidates, half are generated without caption information while the remaining half are generated with caption information, and bounding boxes that are smaller than $\frac{1}{400}$ of the image size are removed. Other examples may use different ranges of values, including broader ranges of values.

To parse generated text into a scene graph (see FIG. 3), some examples use a two-stage approach: (1) a pre-trained dependency parser establishes the synthetic dependency between the words, and (2) dependency trees are mapped to scene graphs, such as graphs 304 and 314, using a rule-based system. Given scene graphs extracted from the text and the human-annotated graphs, an evaluation scheme computes an F-score based on a synonym match between the two graphs among the conjunction of three sets of concepts: object; object, attribute; and object, relationship, subject. In some examples, Semantic propositional image caption evaluation (SPICE) extracts the scene graphs from text and computes the F-score.

In some examples, the evaluation includes three aspects: (1) accuracy—most of the contents appearing in the paragraph should be from the image; (2) completeness—most of the contents appearing in the image should be included in the paragraph; and (3) coherence—paragraphs should be more than merely concatenating sentences. Some example results indicate that architecture 100 matches human authorship for completeness and human-likeness, and further indicate that reduction of hallucination may improve accuracy and coherence of the output of architecture 100.

Architecture 100 has multiple practical applications, such as captioning images for people with vision challenges and closed-loop training of vision language models that may be used in other applications. Other applications include automated annotation of large image sets. Some examples include external information, such as annotating recently-captured images of horse-drawn carts based on external databases indicating locations where horse-drawn carts are currently in use. Some examples may annotate an image with a selected caption and provide the annotated image to a text-to-speech interface to provide narration for people with vision challenges. Some examples may annotate an image with a selected caption and perform training of a vision language model, based on at least the annotated image.

Some examples use rule-based methods to filter out offensive caption material, and some examples use cropped sections of the image and pair each region with the content of visual clues 130. For example, if a caption includes a sentence "The man wears a green shirt" and the image contains a man wearing a blue shirt and a green bush, if the green bush is not in the same cropped portion of the image as the man in the blue shirt, the sentence will be filtered out.

Figure 4A:
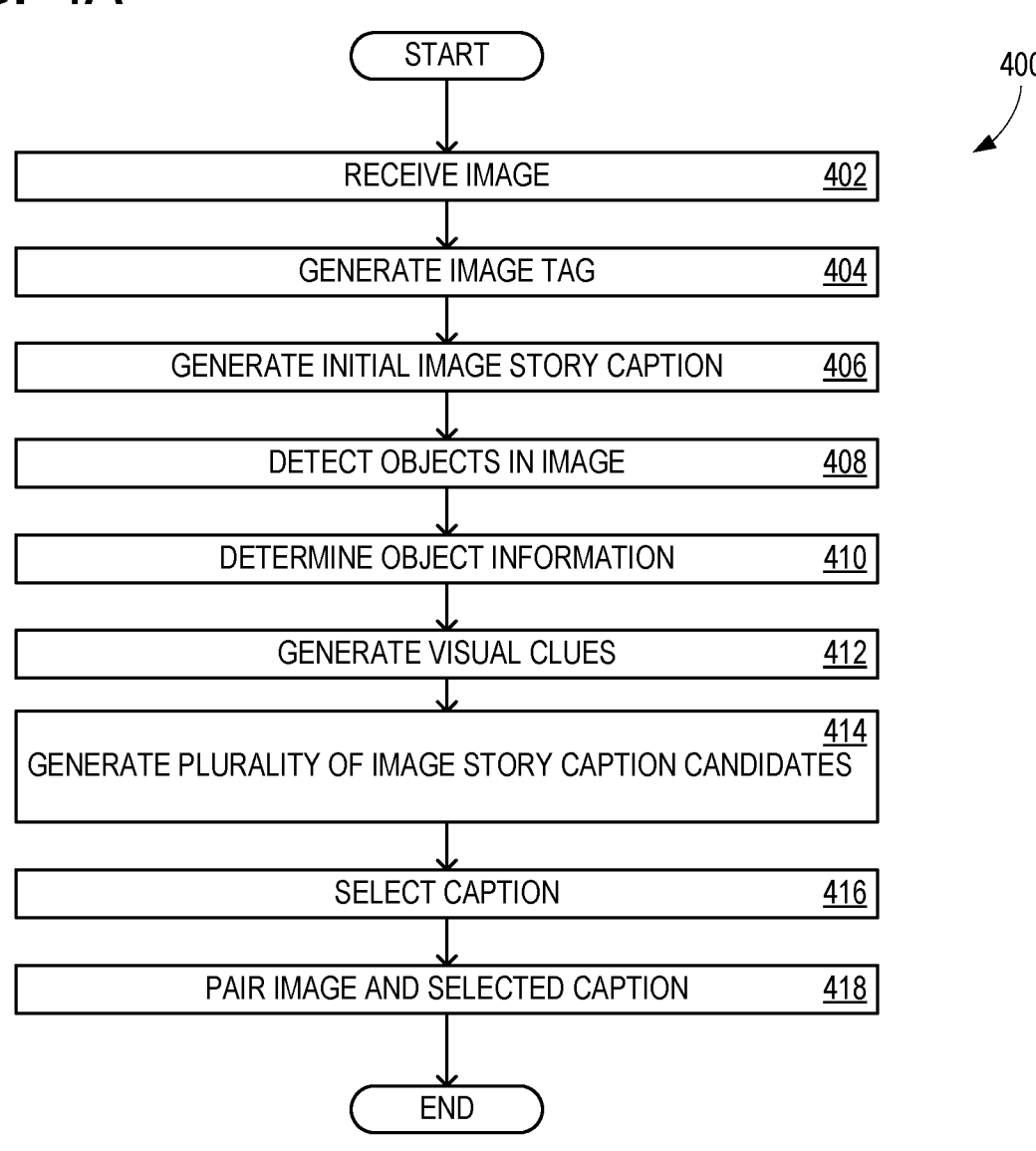
FIG. 4A shows a flowchart illustrating exemplary opera-tions that may be performed when using examples of the disclosure.

FIG. 4A shows a flowchart 400 illustrating exemplary operations that may be performed by architecture 100. In some examples, operations described for flowchart 400 are performed by computing device 600 of FIG. 6. Flowchart 400 commences with vision language model 112, captioner 114, and object detector 116 receiving image 102 in operation 402.

In operation 404 vision language model 112 generates, for image 102, visual information 120 comprising text such as image tags 122. In operation 406, captioner 114 generates, for image 102, initial image caption 124 of visual information 120. In operation 408, object detector 116 detects plurality of objects 118 in image 102.

Operation 410 determines, for each object in plurality of objects 118 in image 102, object information 126. In some examples, object information 126 comprises at least one item selected from the list consisting of: an object tag, an object caption, an object attribute, and an object location.

Operation 412 generates visual clues 130 based on at least image tags 122 of visual information 120. In some examples, operation 412 further comprises, based on at least initial image caption 124 and object information 126 of visual information 120, generating visual clues 130. In operation 414, generative language model 140 generates, from visual information 120, plurality of image story caption candidates 144. In some examples, generative language model 140 intakes caption focus 132 and generates plurality of image story caption candidates 144 based on at least caption focus 132.

Operation 416 includes, based on at least evaluation of image 102 and plurality of image story caption candidates 144 by vision language model 150, selecting selected story caption 154, which may have previously been story caption 141, from among plurality of image story caption candidates 144. In some examples, vision language model 112 and vision language model 150 both comprise a common vision language model. In some examples, vision language model 112 and vision language model 150 are different models, although with somewhat similar architecture.

In some examples, vision language model 150 selects selected story caption 154 from among plurality of image story caption candidates 144. In some examples, vision language model 150 scores plurality of image story caption candidates 144 and a down selection component 152 selects selected story caption 154 based on at least the scores from vision language model 150. Operation 418 pairs image 102 with selected story caption 154.

Figure 4B:
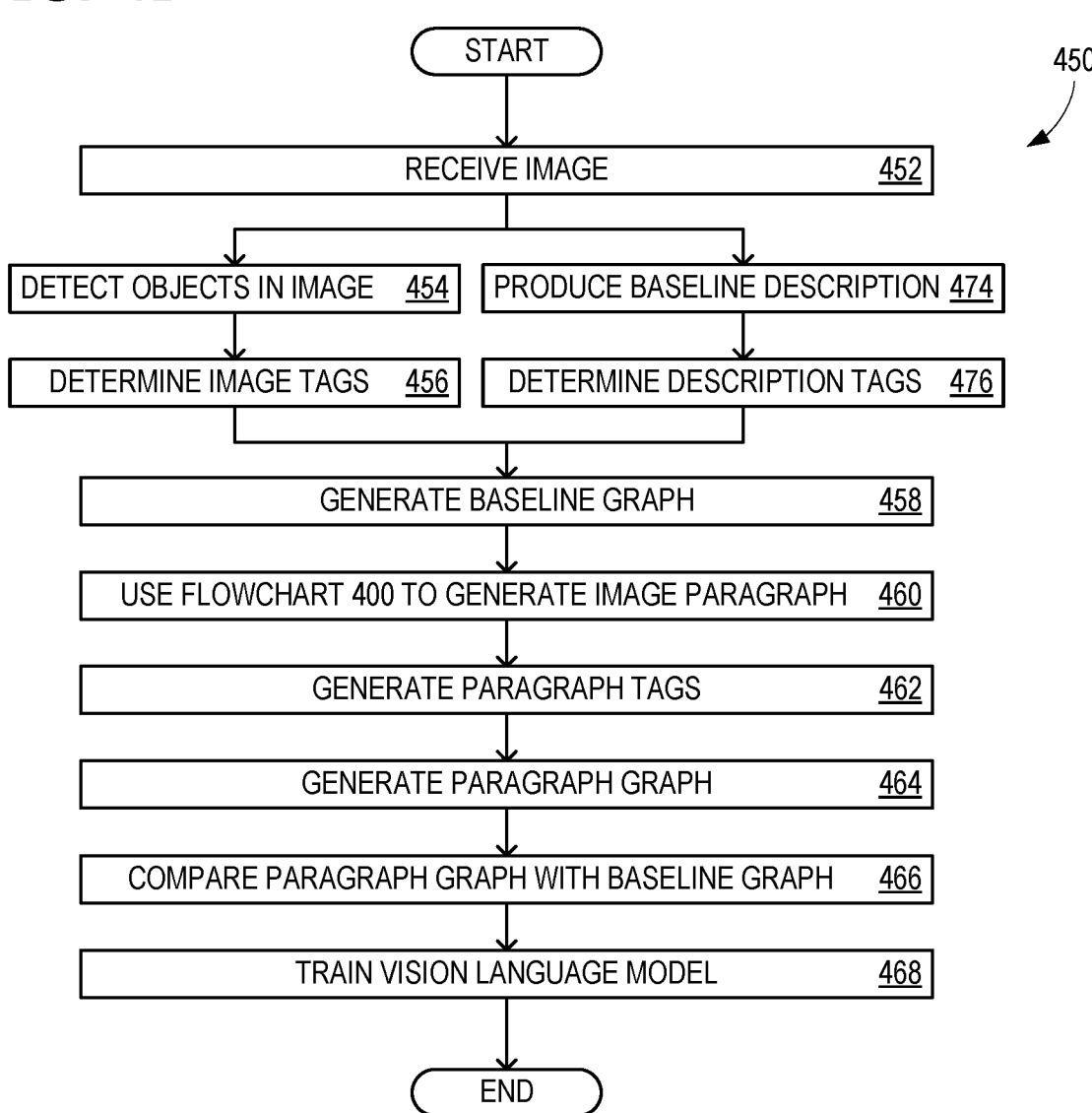
FIG. 4B shows a flowchart illustrating exemplary opera-tions that may be performed when using examples of the disclosure.

FIG. 4B shows a flowchart 450 illustrating exemplary operations that may be performed when using examples of architecture 100. In some examples, at least some operations described for flowchart 400 are performed by computing device 600 of FIG. 6. Flowchart 450 commences with architecture 100 receiving image 102 in operation 452. In one option, operation 454 detects plurality of objects 118 in image 302 and operation 456 determines image tags from the detected objects in image 302. In an alternative version, a human authors "ground truth" baseline description 306 in operation 474 operation 476 determines image tags from baseline description 306. Using the images tags, operation 458 generates baseline graph 304.

Flowchart 400 is used to generate story caption 312, which may be selected story caption 154 or any of image story caption candidates 144 used for improving the operation of architecture 100 by scoring the performance of vision language model 112 and/or vision language model 150, rather than used only as an output product. Operation 462 determines image tags from story caption 312, and operation 464 uses those image tags to generate caption graph 314. Operation 466 compares baseline graph 304 with caption graph 314. ML component 170 determines a score that is used for further training or improvement of vision language model 112 (and/or vision language model 150) in operation 468.

FIG. 5 shows a flowchart 500 illustrating exemplary operations that may be performed using examples of architecture 100. In some examples, operations described for flowchart 500 are performed by computing device 600 of FIG. 6. Flowchart 500 commences with operation 502, which includes generating, by a first vision language model, for an image, visual information comprising text.

Operation 504 includes generating, by a generative language model, from the visual information, a plurality of image story caption candidates. Operation 506 includes, based on at least evaluation of the image and the plurality of image story caption candidates by a second vision language model, selecting a selected caption from among the plurality of image story caption candidates.

Additional Examples

An example system comprises: a processor; and a computer-readable medium storing instructions that are operative upon execution by the processor to: generate, by a first vision language model, for an image, visual information comprising text; generate, by a generative language model, from the visual information, a plurality of image story caption candidates; and based on at least evaluation of the image and the plurality of image story caption candidates by a second vision language model, select a selected caption from among the plurality of image story caption candidates.

An example computerized method comprises: generating, by a first vision language model, for an image, visual information comprising text; generating, by a generative language model, from the visual information, a plurality of image story caption candidates; and based on at least evaluation of the image and the plurality of image story caption candidates by a second vision language model, selecting a selected caption from among the plurality of image story caption candidates.

One or more example computer storage devices have computer-executable instructions stored thereon, which, on execution by a computer, cause the computer to perform operations comprising: generating, by a first vision language model, for an image, visual information comprising text; generating, by a generative language model, from the visual information, a plurality of image story caption candidates; and based on at least evaluation of the image and the plurality of image story caption candidates by a second vision language model, selecting a selected caption from among the plurality of image story caption candidates.

Alternatively, or in addition to the other examples described herein, examples include any combination of the following:

pairing the image with the selected caption;

the first vision language model and the second vision language model both comprise a common vision language model;

based on at least an image tag of the visual information, generating visual clues;

based on at least an initial image caption of the visual information and object information of the visual information, generating the visual clues;

generating, by a first captioner, for the image, captions of the visual information;

detecting, by an object detector, a plurality of objects in the image;

determining, for each object in the plurality of objects in the image, object information;

the object information comprises at least one item selected from the list consisting of: an object tag, an object caption, an object attribute, and an object location;

the visual information comprises at least one item selected from the list consisting of: an image tag, an initial image caption, and object information;

generating the plurality of image story caption candidates comprises generating the plurality of image story caption candidate based on at least a caption focus.

the second vision language model selects the selected caption from among the plurality of image story caption candidates;

the second vision language model scores the plurality of image story caption candidates; and scoring or ranking the plurality of image story caption candidates.

While the aspects of the disclosure have been described in terms of various examples with their associated operations, a person skilled in the art would appreciate that a combination of operations from any number of different examples is also within scope of the aspects of the disclosure.

Example Operating Environment

FIG. 6 is a block diagram of an example computing device 600 for implementing aspects disclosed herein, and is designated generally as computing device 600. In some examples, one or more computing devices 600 are provided for an on-premises computing solution. In some examples, one or more computing devices 600 are provided as a cloud computing solution. In some examples, a combination of on-premises and cloud computing solutions are used. Computing device 600 is but one example of a suitable computing environment and is not intended to suggest any limitation as to the scope of use or functionality of the examples disclosed herein, whether used singly or as part of a larger set.

Neither should computing device 600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 600 includes a bus 610 that directly or indirectly couples the following devices: computer storage memory 612, one or more processors 614, one or more presentation components 616, input/output (I/O) ports 618, I/O components 620, a power supply 622, and a network component 624. While computing device 600 is depicted as a seemingly single device, multiple computing devices 600 may work together and share the depicted device resources. For example, memory 612 may be distributed across multiple devices, and processor(s) 614 may be housed with different devices.

Bus 610 represents what may be one or more busses (such as an address bus, data bus, or a combination thereof). Although the various blocks of FIG. 6 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 612 may take the form of the computer storage media referenced below and operatively provide storage of computer-readable instructions, data structures, program modules and other data for the computing device 600. In some examples, memory 612 stores one or more of an operating system, a universal application platform, or other program modules and program data. Memory 612 is thus able to store and access data 612a and instructions 612b that are executable by processor 614 and configured to carry out the various operations disclosed herein.

In some examples, memory 612 includes computer storage media. Memory 612 may include any quantity of memory associated with or accessible by the computing device 600. Memory 612 may be internal to the computing device 600 (as shown in FIG. 6), external to the computing device 600 (not shown), or both (not shown). Additionally, or alternatively, the memory 612 may be distributed across multiple computing devices 600, for example, in a virtualized environment in which instruction processing is carried out on multiple computing devices 600. For the purposes of this disclosure, "computer storage media," "computer-storage memory," "memory," and "memory devices" are synonymous terms for the computer-storage memory 612, and none of these terms include carrier waves or propagating signaling.

Processor(s) 614 may include any quantity of processing units that read data from various entities, such as memory 612 or I/O components 620. Specifically, processor(s) 614 are programmed to execute computer-executable instructions for implementing aspects of the disclosure. The instructions may be performed by the processor, by multiple processors within the computing device 600, or by a processor external to the client computing device 600. In some examples, the processor(s) 614 are programmed to execute instructions such as those illustrated in the flow charts discussed below and depicted in the accompanying drawings. Moreover, in some examples, the processor(s) 614 represent an implementation of analog techniques to perform the operations described herein. For example, the operations may be performed by an analog client computing device 600 and/or a digital client computing device 600. Presentation component(s) 616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 600, across a wired connection, or in other ways. I/O ports 618 allow computing device 600 to be logically coupled to other devices including I/O components 620, some of which may be built in. Example I/O components 620 include, for example but without limitation, a microphone, joystick, game pad, satellite dish, scanner, printer, wireless device, etc.

Computing device 600 may operate in a networked environment via the network component 624 using logical connections to one or more remote computers. In some examples, the network component 624 includes a network interface card and/or computer-executable instructions, such as a driver, for operating the network interface card. Communication between the computing device 600 and other devices may occur using any protocol or mechanism over any wired or wireless connection. In some examples, network component 624 is operable to communicate data over public, private, or hybrid (public and private) using a transfer protocol, between devices wirelessly using short range communication technologies, such as near-field communication (NFC), Bluetooth™ branded communications, or the like, or a combination thereof. Network component 624 communicates over wireless communication link 626 and/or a wired communication link 626a to a remote resource 628, which may be a cloud resource, across network 630. Various different examples of communication links 626 and 626a include a wireless connection, a wired connection, and/or a dedicated link, and in some examples, at least a portion is routed through the internet.

Although described in connection with an example computing device 600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors, network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input, such as by hovering, and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer storage medium storing instructions that are operative upon execution by the processor to:
      receive, by a first vision language model, a request for a story caption of an image, the request comprising a caption focus for the image, the caption focus comprising instructions for a format of the story caption, the format being based on a platform the requested story caption is presented in;

generate, by the first vision language model, for the image, visual information comprising an image tag and a visual clue constructed from the image tag;

based on at least the caption focus, generate, by a generative language model, from the visual information, a plurality of image story caption candidates, wherein each of the plurality of image story caption candidates comprise a coherent paragraph of natural-language text describing the image;

for each image story caption candidate of the plurality of image story caption candidates, perform, by a second vision language model, the following:

parse the image story caption candidate into a plurality of sentences;

for each sentence of the plurality of sentences, measure a similarity between the image and each sentence of the plurality of sentences;

remove any sentence from the plurality of sentences with a similarity score below a similarity threshold; and update the image storage caption candidate based on the removing, wherein the updated image story caption comprises an updated coherent paragraph of natural-language text describing the image without any of the sentences having a similarity score below the similarity threshold; and based on at least an evaluation of the image and the plurality of image story caption candidates by the second vision language model, select a caption from among the plurality of image story caption candidates.

2. The system of claim 1, wherein the platform comprises one of the following: visual storytelling platform, advertisement generation platform, and social media platform.

3. The system of claim 1, wherein the format defines a style the story caption is to be applied to.

4. The system of claim 1, wherein the instructions are further operative to: based on at least an initial image caption of the visual information and object information of the visual information, generate the visual clue.

5. The system of claim 1, wherein the instructions are further operative to:

detect, by an object detector, a plurality of objects in the image; and determine, for each object in the plurality of objects in the image, object information, wherein the object information comprises at least one item selected from the list consisting of: an object tag, an object caption, an object attribute, and an object location.

6. The system of claim 1, wherein the instructions are further operative to:

generate, by a first captioner, for the image, captions of the visual information, and wherein the visual information comprises at least one item selected from the list consisting of:

an image tag, an initial image caption, and object information.

7. The system of claim 1, wherein any sentence from the plurality of sentences with a similarity score below the similarity threshold is identified as sentence that includes a hallucination.

8. A computerized method comprising:

receiving, by a first vision language model, a request for a story caption of an image, the request comprising a caption focus for the image, the caption focus comprising instructions for a format of the story caption, the format being based on a platform the requested story caption is presented in;

generating, by first vision language model, for the image, visual information comprising an image tag and a visual clue constructed from the image tag;

based on at least the caption focus, generating, by a generative language model, from the visual information, a plurality of image story caption candidates, wherein each of the plurality of image story caption candidates comprise a coherent paragraph of natural-language text describing the image;

for each image story caption candidate of the plurality of image story caption candidates, perform, by a second vision language model, the following:

parse the image story caption candidate into a plurality of sentences;

for each sentence of the plurality of sentences, measure a similarity between the image and each sentence of the plurality of sentences;

remove any sentence from the plurality of sentences with a similarity score below a similarity threshold; and update the image storage caption candidate based on the removing, wherein the updated image story caption comprises an updated coherent paragraph of natural-language text describing the image without any of the sentences having a similarity score below the similarity threshold; and based on at least an evaluation of the image and the plurality of image story caption candidates by the second vision language model, selecting a caption from among the plurality of image story caption candidates.

9. The method of claim 8, further comprising:

pairing the image with the selected caption.

10. The method of claim 8, further comprising:

based on at least the image tag of the visual information, generating the visual clue.

11. The method of claim 8, further comprising:

based on at least an initial image caption of the visual information and object information of the visual information, generating the visual clue.

12. The method of claim 8, further comprising:

detecting, by an object detector, a plurality of objects in the image; and determining, for each object in the plurality of objects in the image, object information, wherein the object information comprises at least one item selected from the list consisting of:

an object tag, an object caption, an object attribute, and an object location.

13. The method of claim 8, further comprising:

generating, by a first captioner, for the image, captions of the visual information, and wherein the visual information comprises at least one item selected from the list consisting of:

an image tag, an initial image caption, and object information.

14. The method of claim 8, wherein the first vision language model and the second vision language model both comprise a common vision language model.

15. One or more computer storage media having computer-executable instructions stored thereon, which, on execution by a computer, cause the computer to perform operations comprising:

receiving a request for a story caption of an image, the request comprising a caption focus for the image, the caption focus comprising instructions for a format of the story caption, the format being based on a platform the requested story caption is presented in;

generating, for the image, visual information comprising an image tag and a visual clue constructed from the image tag;

based on at least the caption focus, generating, from the visual information, a plurality of image story caption candidates, wherein each of the plurality of image story caption candidates comprise a coherent paragraph of natural-language text describing the image;

for each image story caption candidate of the plurality of image story caption candidates, perform, by a second vision language model, the following:

parse the image story caption candidate into a plurality of sentences;

for each sentence of the plurality of sentences, measure a similarity between the image and each sentence of the plurality of sentences;

remove any sentence from the plurality of sentences with a similarity score below a similarity threshold; and update the image storage caption candidate based on the removing, wherein the updated image story caption comprises an updated coherent paragraph of natural-language text describing the image without any of the sentences having a similarity score below the similarity threshold; and based on at least an evaluation of the image and the plurality of image story caption candidates by the second vision language model, selecting a caption from among the plurality of image story caption candidates.

16. The one or more computer storage media of claim 15, wherein the operations further comprise:

pairing the image with the selected caption.

17. The one or more computer storage media of claim 15, wherein the operations further comprise:

based on at least the image tag of the visual information, generating the visual clue.

18. The one or more computer storage media of claim 15, wherein the operations further comprise:

based on at least an initial image caption of the visual information and object information of the visual information, generating the visual clue.

19. The one or more computer storage media of claim 15, wherein the operations further comprise:

detecting, by an object detector, a plurality of objects in the image; and determining, for each object in the plurality of objects in the image, object information, wherein the object information comprises at least one item selected from the list consisting of:

an object tag, an object caption, an object attribute, and an object location.

20. The one or more computer storage media of claim 15, wherein the operations further comprise:

generating, by a first captioner, for the image, captions of the visual information, and wherein the visual information comprises at least one item selected from the list consisting of:

an image tag, an initial image caption, and object information.

* * * * *